United States Patent
Berkhout et al.

(10) Patent No.: US 10,164,475 B2
(45) Date of Patent: Dec. 25, 2018

(54) WIRELESS POWER RECEIVER

(71) Applicant: NXP B.V., Eindhoven (NL)

(72) Inventors: Marco Berkhout, Nijmegen (NL); Henricus Cornelis Johannes Buthker, Eindhoven (NL); Johannes Petrus Maria van Lammeren, Eindhoven (NL)

(73) Assignee: NXP B.V., Eindhoven (NL)

( * ) Notice: Subject to any disclaimer, the term of this patent is extended or adjusted under 35 U.S.C. 154(b) by 118 days.

(21) Appl. No.: 15/208,116

(22) Filed: Jul. 12, 2016

(65) Prior Publication Data

US 2017/0018967 A1  Jan. 19, 2017

(30) Foreign Application Priority Data

Jul. 13, 2015 (EP) ..................... 15176513

(51) Int. Cl.
  *H02J 50/12* (2016.01)
  *H02J 5/00* (2016.01)
  *H02J 7/02* (2016.01)

(52) U.S. Cl.
  CPC .............. *H02J 50/12* (2016.02); *H02J 5/005* (2013.01); *H02J 7/025* (2013.01)

(58) Field of Classification Search
  CPC .................................. H02J 50/12; H02J 5/005
  See application file for complete search history.

(56) References Cited

U.S. PATENT DOCUMENTS

| 6,301,128 | B1 | 10/2001 | Jang et al. |
| 8,093,758 | B2 | 1/2012 | Hussmann et al. |
| 2004/0218406 | A1 | 11/2004 | Jang et al. |
| 2007/0263421 | A1 | 11/2007 | Kyono |
| 2012/0127765 | A1 | 5/2012 | Maruyama et al. |
| 2015/0244176 | A1* | 8/2015 | Van Den Brink ...... H02J 5/005 307/104 |
| 2015/0341087 | A1* | 11/2015 | Moore ................. H04B 5/0031 455/77 |

FOREIGN PATENT DOCUMENTS

| EP | 2 797 199 A1 | 10/2014 |
| EP | 2 985 846 A1 | 2/2016 |
| WO | WO-2013/112526 A1 | 8/2013 |
| WO | WO-2014/070025 A2 | 5/2014 |

OTHER PUBLICATIONS

Extended European Search Report for Application 15176513.8 (dated Feb. 11, 2016).
Extended European Search Report from application 14180978.0 (dated Jan. 8, 2015).
Integrated Device Technology, Inc.; "Preliminary Datasheet—Industry's First Multi-Mode WPC Compliant Wireless Power Receiver IC—Revision 0.2"; 30 pages (2013).
Texas Instruments, "DataSheet—High-Efficiency Qi v1.1-Compliant Wireless Power Receiver and Battery Charger"; 31 pages (Jul. 2012 revised Feb. 2013).

* cited by examiner

*Primary Examiner* — Jeffrey Shin

(57) ABSTRACT

A wireless electrical power receiver for inductively generating alternating current power in a wireless electrical power transfer system having a transmission resonant frequency, the receiver comprising a receiver resonator having a receiver resonant frequency, the receiver resonator constructed and arranged such that the receiver resonant frequency is detuned from the transmission resonant frequency.

17 Claims, 15 Drawing Sheets

WIRELESS POWER RECEIVER

CROSS-REFERENCE TO RELATED APPLICATIONS

This application claims the priority under 35 U.S.C. § 119 of European patent application no. 15176513.8, filed Jul. 13, 2015 the contents of which are incorporated by reference herein.

FIELD

The present specification relates to a wireless electrical power receiver. In particular, but not exclusively, the present specification relates to a wireless electrical power receiver having a reduced voltage rating.

BACKGROUND

Wireless power transfer is used to transmit electrical power from a power source to a load with at least part of the conduction path formed over a wireless link (i.e. without wires or conductors). Wireless power transfer could have a variety of uses. For example, one area where wireless power transfer has received a lot of attention is the wireless charging of batteries in mobile communication devices.

To wirelessly transfer power, the power source is provided as part of a transmitter, and the load is provided as part of a receiver. The power can be transmitted to the receiver by radiative or non-radiative means. In non-radiative techniques, the transmitter and receiver are wirelessly coupled (for example, inductive or capacitive coupling). In radiative techniques, the power may be transmitted using, for example, microwaves or lasers.

A number of different standards have been developed to systemize different wireless power transfer systems. For example, the Qi standard has been developed by the Wireless Power Consortium to provide contactless power transfer to a mobile device based on near field magnetic induction between coils. Alternative standards have also been developed by the Alliance for Wireless power and the Power Matters Alliance.

SUMMARY

According to a first aspect of the disclosure, there is provided a wireless electrical power receiver for inductively generating alternating current power in a wireless electrical power transfer system having a transmission resonant frequency, the receiver comprising a receiver resonator having a receiver resonant frequency, the receiver resonator constructed and arranged such that the receiver resonant frequency is detuned from the transmission resonant frequency.

The wireless electrical power receiver may comprise: a rectifier arranged to convert the alternating current power to a direct current power, for providing the direct current power to a load; and a controller configured to selectively short circuit the receiver resonator, such that electrical current is retained in the receiver resonator when the receiver resonator is short circuited.

The rectifier may be a synchronous rectifier comprising a plurality of switches, and the controller may be configured to control the plurality of switches to rectify the induced alternating current power, and to selectively short circuit the receiver resonator.

The breakdown voltage of each of the plurality of switches may be less than or equal to 6 Volts.

The rectifier may comprise a first pair of switches, and a second pair of switches, wherein the first pair of switches is implemented as P-type MOS transistors.

The controller may be configured to: close a one of the first pair and a one of the second pair of switches, and open the other of the first pair of switches and the other of the second pair of switches in order to convert the alternating current power to a direct current power; and open both of the first pair of switches and close both of the second pair of switches to short circuit the receiver resonator.

The controller may be configured to: activate the short circuit of the receiver resonator if an output voltage of the rectifier exceeds a first threshold.

The controller may be configured to: deactivate the short circuit of the receiver resonator if a current in the receiver resonator exceeds a second threshold.

If the output voltage of the rectifier exceeds a third threshold, higher than the first threshold, the controller may be configured to: activate the short circuit of the receiver resonator; and subsequently deactivate the short circuit of the receiver resonator if the current in the receiver resonator exceeds the second threshold only when the output voltage of the rectifier is below the first threshold. The short circuit may oscillate between active and inactive.

The controller may be configured to: activate or deactivate the short circuit to maintain the output voltage of the rectifier below a first limit and to maintain a power dissipation of the receiver below a second limit.

The inductively generated alternating current power may oscillate at a first frequency, the first frequency having a value taken from a range of operating frequencies, and the controller may maintain the output voltage of the rectifier below the first limit and the power dissipation of the receiver below the second limit over the range of operating frequencies.

The third threshold may be equal to the first limit, and the first limit may be a voltage rating of the rectifier.

The controller may be configured to: control the wireless power receiver such that: in a first mode of operation, the short circuit of the receiver resonator is activated; in a second mode of operation, the short circuit of the receiver resonator is deactivated; in a third mode of operation, the short circuit is oscillated between activated and deactivated; and the wireless power receiver switches between the first, second and third modes of operation.

The receiver resonator may comprise an inductor and a capacitor, the inductance of the inductor and the capacitance of the capacitor configured to provide the detuned receiver resonant frequency.

According to a second aspect of the disclosure, there is provided a wireless electrical power receiver, comprising a receiver resonator, the receiver resonator having a receiver resonant frequency and being arranged to inductively couple to a wireless power transmitter to generate an electrical current, the wireless power transmitter having a transmitter resonant frequency, wherein the receiver resonant frequency is detuned from the transmitter resonant frequency.

The second aspect may include any one or more of the optional features of the first aspect.

According to a third aspect of the disclosure, there is provided a wireless electrical power transfer system comprising: a wireless electrical power transmitter comprising a transmitter resonator tuned to the transmission resonant frequency; and a wireless electrical power receiver according to the first or second aspect.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
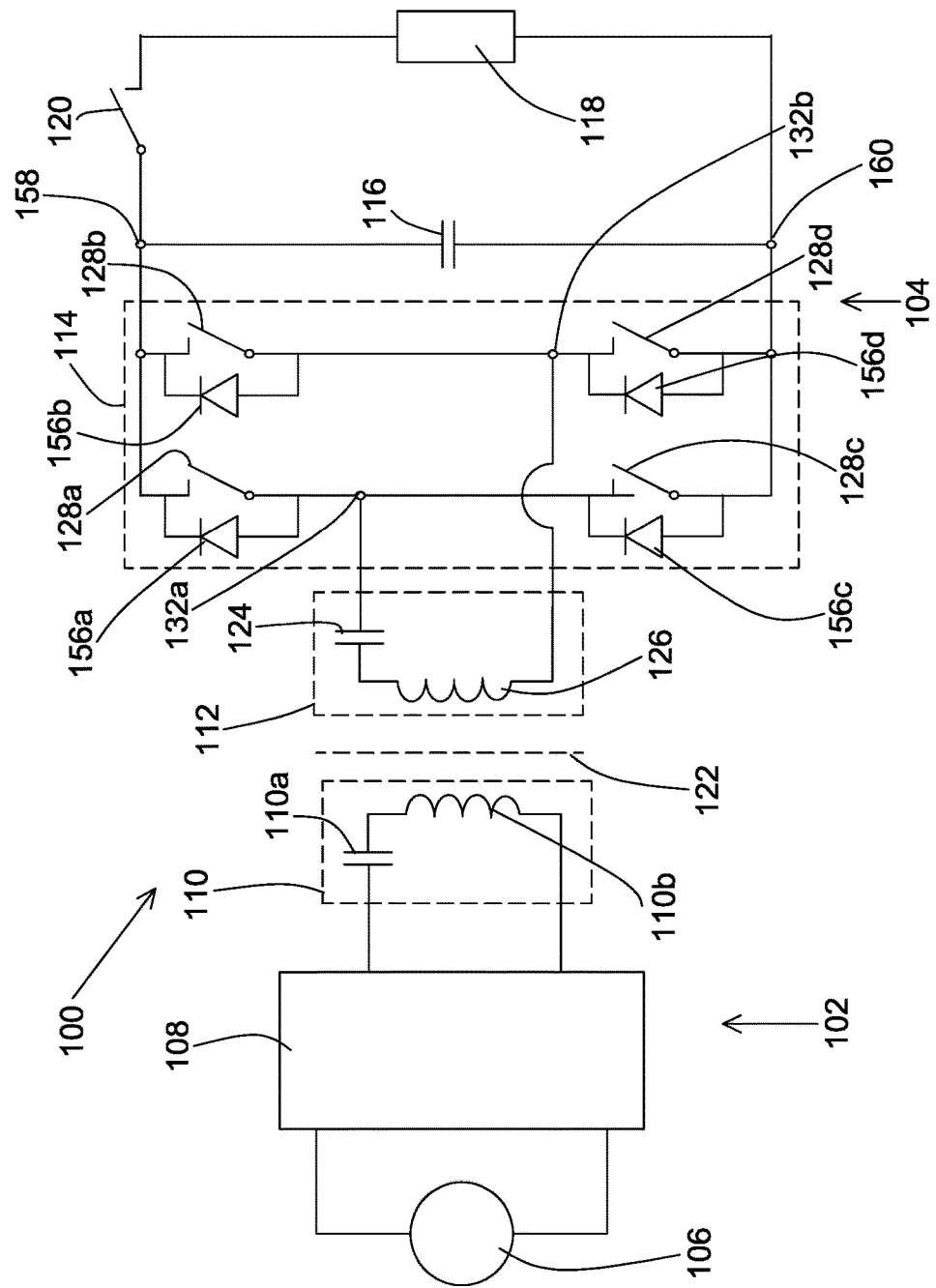
FIG. 1 illustrates an example embodiment of a wireless power transfer system.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 shows an example embodiment of a wireless power transfer system 100. The system 100 includes an electrical power transmitter 102 and an electrical power receiver 104, coupled across an interface 122.

The transmitter 102 comprises a power source 106, such as a voltage supply, and transmitter control circuitry 108. The transmitter control circuitry 108 controls the operation of the power supply 106, and may include, if required, an amplifier (not shown) and/or a DC to AC converter/inverter (not shown). The power supply 106 and transmitter control circuitry 108 drive a transmitter resonator 110 tuned to a transmitter resonant frequency ($F_{TXRES}$).

In one example, the transmitter resonator 110 may comprise an LC-tank, having a capacitor 110a and an inductor 110b in series. The LC-tank of the transmitter 102 may be referred to as the primary LC-tank. The inductance ($L_p$) of the primary inductor 110b and the capacitance ($C_p$) of primary capacitor 110a are selected to provide the desired transmitter resonant frequency.

During wireless transfer of power, the power transferred can be controlled by changing the switching frequency ($F_{SW}$) of the voltage supplied to the transmitter resonator 110. The power transfer can also be controlled by changing the voltage provided by the power supply 106, and the duty cycle of the transmitter 102.

In the Qi standard, the transmitter resonant frequency is set at 100 kHz, although it will be appreciated that any transmitter resonant frequency may be used.

The receiver 104 comprises a receiver resonator 112, a rectifier 114, a rectifier capacitor 116 connected across the output of the rectifier 114, and a load 118, for example the device to be charged. A switch 120 serves to connect and disconnect the load 118. When the receiver 104 and transmitter 102 are inductively coupled, but the load 118 is disconnected (either via the switch 120 or because there is no load), the receiver 104 is open circuit and the energy induced in the receiver 104 is stored in the rectifier capacitor 116.

The transmitter resonator 110 and receiver resonator 112 are inductively coupled across the interface 122, so that in use (with the switch 120 closed), the transmitter resonator 110 generates an oscillating magnetic field, which inductively generates an AC signal in the receiver resonator 112. The rectifier 114 then converts the AC signal to a DC signal, and the DC signal is supplied to the load 118 at an output node 158.

To achieve coupling between the transmitter 102 and receiver 104, the receiver resonator 112 is tuned to a receiver resonant frequency ($F_{RXRES}$), which is tuned to be the same as the transmitter resonant frequency.

When a transmitter resonator 110 and a receiver resonator are in close proximity to one another (i.e. they are effectively inductively coupled) the proximity of the resonators 110, 112 may have an effect on the transmitter and receiver resonant frequency (typically the frequency is reduced compared to when the resonators are considered in isolation). In the current disclosure, and in at least the specification of the Qi standard, the transmitter resonator 110 and receiver resonator 112 are considered to be tuned when they have the same resonant frequency when they are in close proximity. The transmitter resonator 110 and receiver resonator 112 are also considered to be tuned when they have the same resonant frequency during, for example, a charging operation such that power is supplied to a load 118 in the receiver 104, and the receiver 104 is closed circuit.

The transmitter resonator 110 and receiver resonator 112 are considered to have the same resonant frequency when their frequencies are identical or identical within a margin of error of 10% at most.

The degree of coupling between the transmitter resonator 110 and receiver resonator 112 is described by a coupling factor (k). The coupling factor extends between 0 (no coupling) and 1 (equivalent to a transformer) and varies depending on a number of factors including the material, size, inductance and relative position and orientation of the resonators 110, 112, the material/environment forming the interface 122 and the distance between the transmitter 102 and the receiver 104. Typically, in real-world wireless power transfer environments, the coupling factor is in the range between 0.3 and 0.7. This range is generally referred to as tightly coupled.

In one example embodiment of a receiver 104, the receiver resonator 112 may comprise an LC-tank (referred to as the secondary LC-tank), having a secondary capacitor 124 and a secondary inductor 126 connected in series, the secondary inductor 126 being inductively coupled to the primary inductor 110b. The inductance ($L_s$) of the secondary inductor 126 and the capacitance ($C_s$) of the secondary capacitor 124 are selected to provide the desired receiver resonant frequency.

The receiver resonator 112 provides an input signal to the rectifier 114 at a first input node 132a and a second input node 132b. In one example embodiment, the rectifier 114 may comprise a diode bridge (not shown). A diode bridge is an example of passive rectification. In another example embodiment, the rectifier 114 may employ a synchronous rectifier, as shown in FIG. 1. In a synchronous rectifier, switches 128a-d (for example MOSFET switches) are used in a bridge configuration. Diodes 156a-d are provided in parallel to the switches 128, such that with all the switches are open, the rectifier 114 operates as a passive bridge rectifier. The switches 128 are controlled to provide the rectification function. Use of synchronous rectification reduces conduction losses.

A synchronous rectifier 114 (bridge rectifier) includes a first switch 128a (diode) coupled between the first input node 132a and a first side of the load 118, and a second switch 128b (diode) coupled between the second input node 132b and the first side of the load 118. Similarly, a third switch 128c (diode) is coupled between the first input node 132a and a second side of the load 118, and a fourth switch 128d (diode) is coupled between the second input node 128d and the second side of the load 118. The output node 158 is provided between the first switch 128a (diode) and the second switch 128c (diode). A rectifier capacitor 116 is connected between the output node 158 and a second node 160, between the third switch 128c (diode) and the fourth switch 128d (diode), so the capacitor 116 is in parallel to the load 118. The switches 128 (diodes) are all arranged to allow current to pass in the same direction, towards the output node 158.

The operation of the switches/transistors 128 in the synchronous rectifier 114 is governed by a controller 130, which operates the switches 128 in pairs. The first switch 128a and the fourth switch 128d are operated as a first pair of switches, and the second switch 128b and the third switch 128c are operated as a second pair of switches. In a first state, the first pair of switches is opened and the second pair of switches is closed and in a second state, the first pair of switches is closed and the second pair of switches is opened. The rectifier 114 alternates between the first state and the second state, mirroring the oscillation of the induced AC signal, to rectify the induced signal and ensure DC power is always provided at the output node 158.

For high efficiency in the receiver 102, the on-resistance of the switches 128 should be low, and the off-state of the switches 128 should have a breakdown voltage that is higher than the maximum voltage that can appear at the output node 158.

Figure 2A:
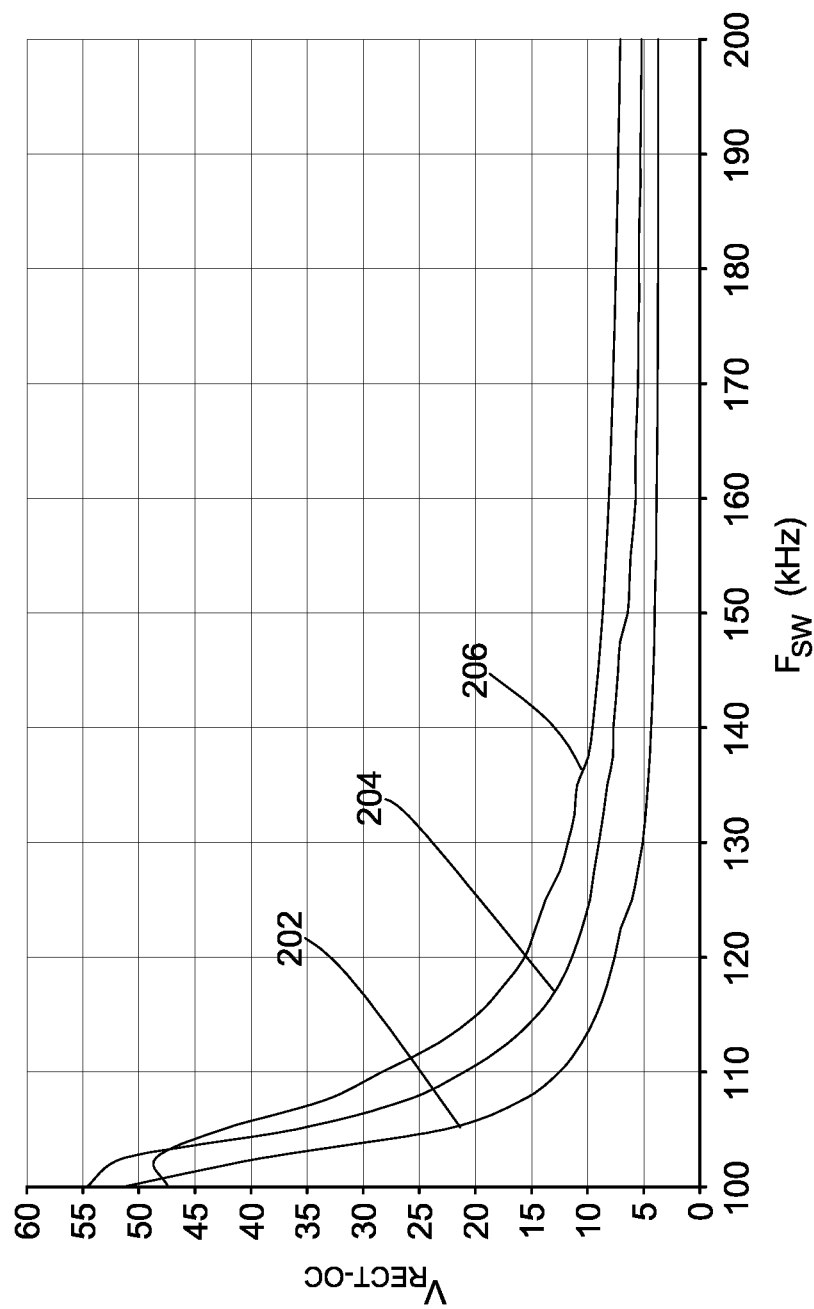
FIG. 2A illustrates the open circuit output voltage of an example embodiment of a wireless power receiver.
Figure 2B:
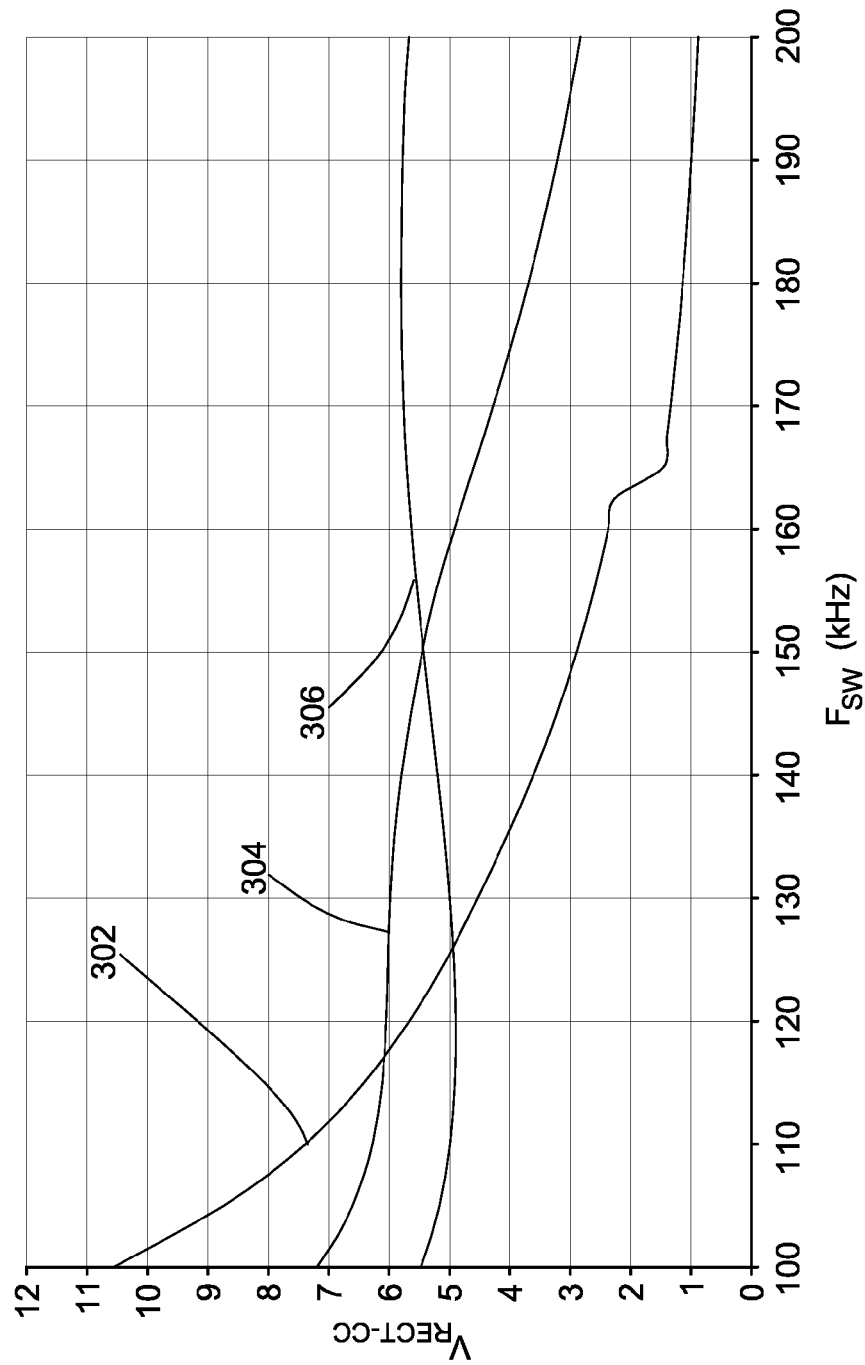
FIG. 2B illustrates the closed circuit output voltage of an example embodiment of a wireless power receiver.

FIGS. 2A and 2B show the voltage ($V_{rect}$) at the output node 158, as a function of the switching frequency of the transmitter 102, for a variety of different coupling factors.

FIG. 2A shows the voltage for a receiver 104 with a load 118 of 100 ohms. This load 118 models an open circuit receiver 104 (i.e. no load 118 connected), and so the voltage can be considered the open circuit voltage of the receiver 104 ($V_{RECT-OC}$).

FIG. 2B shows the voltage for a receiver 104 with a load 118 of 5 ohms. This load 118 models a closed circuit receiver 104, and so the voltage can be considered the closed circuit rectifier voltage of the receiver 104 ($V_{RECT-CC}$). This load 118 is chosen by way of example only, and is chosen to represent a battery of a mobile device being charged. Any suitable value load 118 may be used.

In FIGS. 2A and 2B, the transmitter 102 has a transmitter resonant frequency of 100 kHz, the receiver 104 has a receiver resonant frequency of 100 kHz, and the voltage supply 106 in the transmitter is fixed at 5V.

In FIG. 2A, a first curve 202 (the lowest curve at $F_{SW}$=120 kHz) shows the voltage for a coupling factor of 0.3, a second curve 204 (the middle curve at $F_{SW}$=120 kHz) shows the voltage for a coupling factor of 0.5, and a third curve 206 (the highest curve at $F_{SW}$=120 kHz) shows the voltage for a coupling factor of 0.7.

As can be seen from FIG. 2A, the open-circuit rectifier voltage in the receiver 104 is very high when the switching frequency is near the transmitter resonant frequency and falls off rapidly at higher switching frequencies. Across the range of coupling factors, the open-circuit voltage in the receiver 104 can approach or exceed 50V as its maximum.

The open circuit voltage is high near resonance because negligible power is absorbed by the load 118, when the receiver 104 is open circuit. Therefore, the diodes in the rectifier 114 are not forward biased and the receiver resonator 112 can be considered isolated. This means that resonance is impossible in the receiver resonator 112, because there is no closed circuit.

For an isolated receiver resonator 112, the open-circuit voltage in the receiver 104 equals the voltage ($V_{Ls}$) that is induced in the secondary inductor 126, and is proportional to the voltage ($V_{Lp}$) across the primary inductor 110b. The rectifier 114 output voltage when the receiver 104 is open circuit is given by equation 1:

$$V_{RECT\_OC} = V_{Ls} = V_{Lp} \cdot k \cdot \sqrt{\frac{L_s}{L_p}} \qquad (1)$$

At switching frequencies much higher than the transmitter resonant frequency of the transmitter resonator 110, the primary capacitor 110a can be considered a short, and the voltage across the primary inductor 110b converges to the supply voltage. However, near the resonant frequency of the transmitter resonator 110, the voltage across the primary inductor 110b increases towards much higher values due to the resonance of the primary inductor 110b with the primary capacitor 110a and is only limited by the quality factor of the primary LC-tank ($Q_P$).

The quality factor of the primary LC-tank is proportional to the transmitter resonant frequency and the inductance of the primary inductor 110b, and inversely proportional to the combination of series resistance in the primary inductor 110b and on-resistance of the switches in the inverter in the transmitter 102, and is given by:

$$Q_P = \frac{2\pi P_{TXRES} L_p}{R_p} \qquad (2)$$

In FIG. 2B, a first curve 302 (the lowest curve at $F_{SW}$=100 kHz) shows the voltage for a coupling factor of 0.3, a second curve 304 (the middle curve at $F_{SW}$=100 kHz) shows the voltage for a coupling factor of 0.5, and a third curve 306 (the highest curve at $F_{SW}$=120 kHz) shows the voltage for a coupling factor of 0.7.

During operating of the wireless power transfer system 100 (i.e. when a load 118 is connected and the receiver 104 forms a closed circuit) the transmitter 102 is operated so that the switching frequency is altered until the output voltage of the rectifier 114 reaches a target value. Once the target power is reached, the switching frequency is kept constant and the wireless power transfer system 100 is operated in steady state. The system is considered to be in steady-state when the system behaves the same way for each switching frequency cycle of operation. FIGS. 2A and 2B are for steady state operation.

In the Qi standard, the target voltage is 5V. With a 5 ohm load connected, this corresponds to 5 W of power being delivered to the load 118.

As can be seen from FIG. 2B, for a coupling factor of 0.3, the target voltage is reached at a switching frequency of around 125 kHz and for a coupling factor of 0.5 the target voltage is reached at a switching frequency of around 155 kHz. For a coupling factor of 0.7 the target voltage is reached at switching frequencies of between around 110 kHz and 135 kHz. After this region, the voltage gradually increases to a peak at 180 kHz. Therefore, for at least some values of the coupling factor, the output voltage of the rectifier 114 does not monotonically decrease with the switching frequency.

Since the coupling factor, as discussed above, includes a number of factors that cannot be set with system design (for example how a user places a device to be charged on a base station), it is necessary to form the switches 128 in the receiver 104 with a breakdown voltage that is higher than the maximum voltage that can appear at the output of the rectifier 114 at any coupling factor. As can be seen from FIG. 2B, the closed circuit voltage drops significantly compared to the open circuit voltage. Therefore, the open circuit voltages are the highest voltages possible in the receiver 104. Therefore, based on FIGS. 2A and 2B, the breakdown voltage of the switches 128 should be higher than 55V.

In general, switches 128 (such as the MOSFETs used in the rectifier 114 in the receiver 104) with a higher breakdown voltage have a higher value for on-resistance×area. Therefore, for a fixed on-resistance, the area of the MOSFET increases with increasing breakdown voltage. The area on a chip taken up by a device directly translates to manufacturing cost, and so reducing breakdown voltage can reduce area and hence manufacturing cost. Reduced area of components also allows for smaller chips to be made, providing smaller products.

Figure 3:
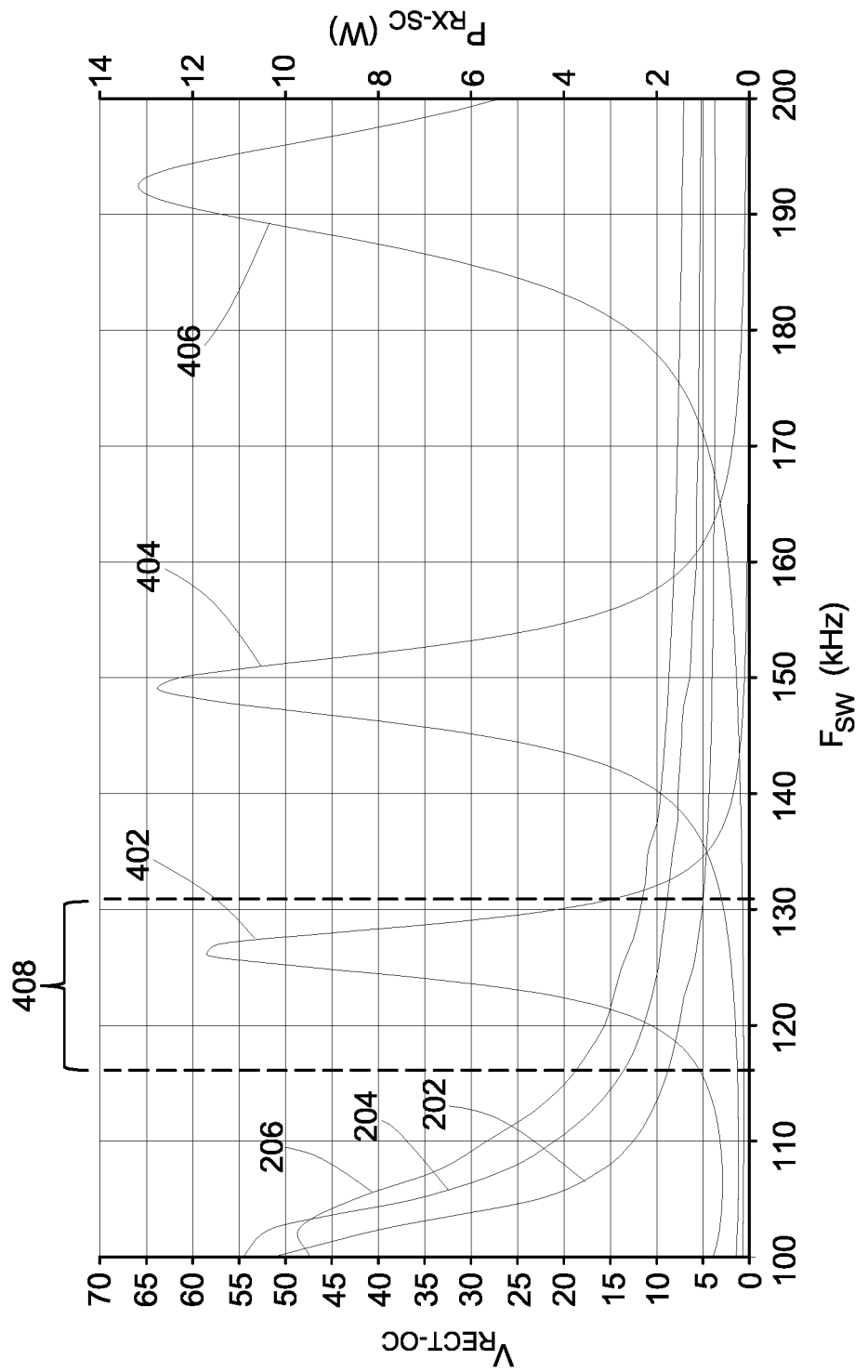
FIG. 3 illustrates the power dissipation of an example embodiment of a wireless power receiver with a short circuit.

FIG. 3 shows the power dissipation (right hand y-axis—$P_{RX-SC}$) for a wireless power receiver 104 which has a short circuit connected across the receiver resonator 112, as a function of the switching frequency.

The short circuit can be applied in any suitable manner. In one example, the switches 128 of the synchronous rectifier 114 can be controlled by the controller 130 to provide the short circuit for part of the duty cycle instead of rectification.

The short circuit can be applied by closing the third switch 128c and the fourth switch 128d, leaving the first switch 128a and second switch 128b open. This means that no current flows towards the rectifier capacitor 116 and the output voltage cannot increase any more.

The short circuit may be applied for all or part of the duty cycle of the rectifier. The curves shown in FIG. 3 are for a receiver resonator 112 with a short circuit connected for 100% of the duty cycle. The power dissipation for a receiver resonator 112 that is short circuited for only a part of the duty cycle of the receiver 104 is almost the same as this.

As discussed above, the rectifier 114 rectifies the induced AC signal by alternating between opening a first pair of switches and a second pair of switches. The short circuit is applied at the changeover between these two states.

The relative amount of time that the short circuit is applied for is dependent on the output voltage of the rectifier 114, and is controlled to maintain the output voltage of the rectifier 114 at the target level (in the example being discussed 5V). As the output voltage of the rectifier 114 increases, the short circuit is active for a greater portion of the duty cycle to maintain the desired threshold.

Therefore, for a receiver 104 with a short circuit, the open circuit voltage is always approximately at the target value (5V) or lower. However, the power dissipation is higher than for a receiver 104 without a short circuit.

Power dissipation leads to temperature increase on the chip/circuit board on which the receiver 104 is formed. Increased temperature can cause catastrophic damage to chip components, can reduce working efficiency of components and requires additional heat sinking elements to mitigate the temperature increase.

Accordingly, in addition to limiting the voltage to below a certain limit, the power dissipation should be kept below a threshold. Any suitable threshold may be chosen, depending on the requirements of the circuit. In one example, a threshold of 1 W, leading to 50 to 75K of temperature increase, is used.

Therefore, although the receiver 104 with the short circuit has an open circuit voltage within the desired limit, it cannot be used because the power dissipation is too high.

The power dissipation in FIG. 3 shows three separate peaks at different frequencies, each for different coupling factor, with the power dissipation reducing dramatically either side of the peak. A first curve 402 (with the peak occurring at approximately 125 kHz) is for a coupling factor of 0.3, a second curve 404 (with the peak occurring at approximately 150 kHz) is for a coupling factor of 0.5, and a third curve 406 (with the peak occurring at approximately 150 kHz) is for a coupling factor of 0.7. FIG. 3 also shows the open circuit voltage (left hand y axis 202, 204, 206) originally shown in FIG. 2A.

As with the examples in FIGS. 2A and 2B, the transmitter 102 has a transmitter resonant frequency of 100 kHz, the receiver 104 has a receiver resonant frequency of 100 kHz, and the voltage supply 106 in the transmitter is fixed at 5V.

The voltages shown in FIG. 2A and FIG. 3 are the open circuit voltages for a receiver 104 without a short circuit. As discussed above, for a receiver 104 with a short circuit, the open circuit voltage in is always limited to the target voltage (for example 5V) or lower. For the receiver 104 without the short circuit 104, the power dissipation is always approximately 1 W or lower.

As can be seen from FIG. 3, for each coupling factor, there is a switching frequency range where the power dissipation of the short circuited receiver 104 is above 1 W and the maximum open circuit voltage is above 5V. For example, FIG. 3 shows the region 408 for a coupling factor of 0.3.

In these regions, neither the receiver 104 with the short circuit nor the receiver 104 without the short circuit may be operated within the desired parameters of dissipation less than 1 W and maximum output voltage less than 5V.

Figure 4:
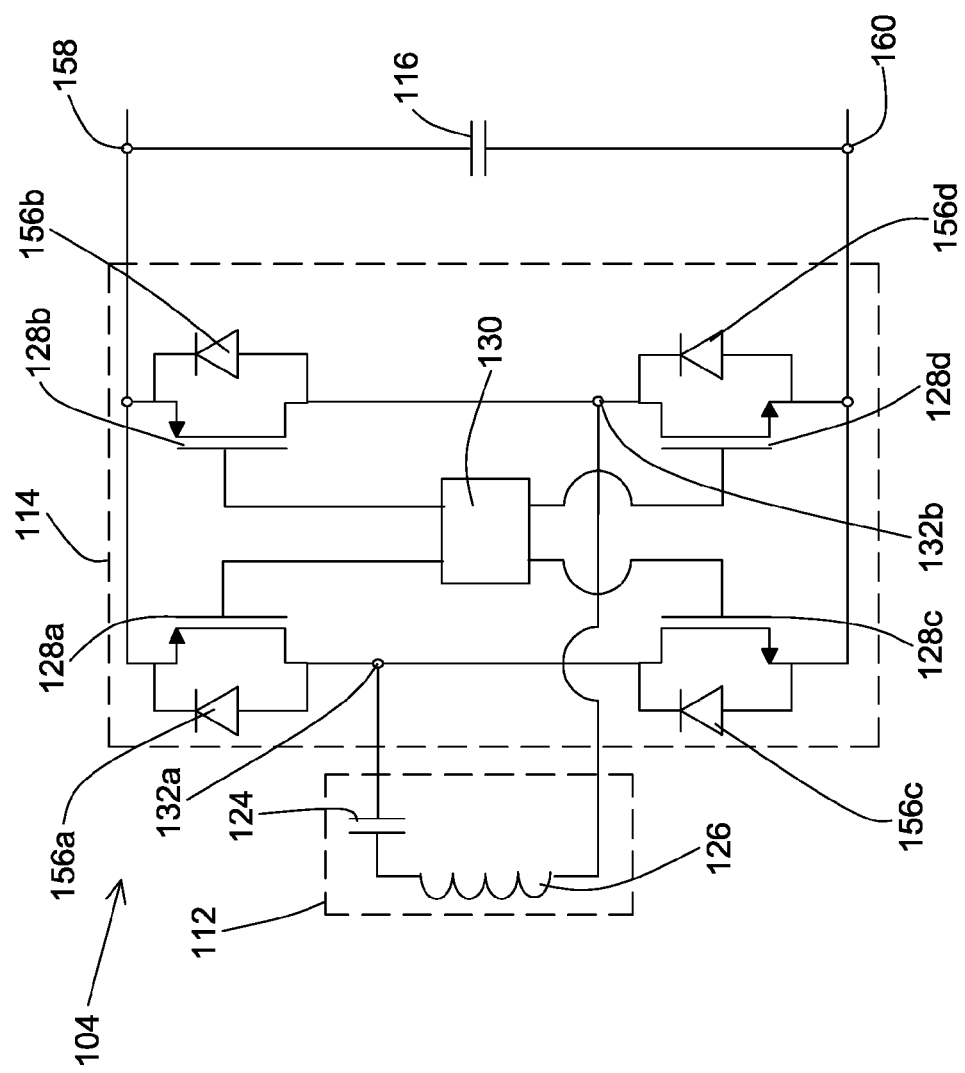
FIG. 4 illustrates an example embodiment of a wireless power receiver.

FIG. 4 illustrates an example embodiment of the receiver resonator 112 and rectifier 114 of a wireless power receiver 104 that can be used to eliminate the regions where neither the receiver 104 with a short circuit nor the receiver 104 without a short circuit may be operated within the desired parameters of dissipation less than 1 W and maximum output voltage less than 5V.

It will be appreciated that the load may be connected as shown in FIG. 1, and the wireless power transmitter 102 may also be inductively coupled as shown in FIG. 1. FIG. 4 illustrates the switches 128 as transistors rather than switches, but it will be appreciated that these are equivalent.

From Equation 1, the open-circuit voltage is proportional to the square root of the ratio between the inductance of the secondary inductor 126 and the inductance of the primary inductor 110b. Therefore, for a receiver 104 with a given secondary inductor 126, reducing the inductance of the secondary inductor 126, and keeping all other factors the same, reduces the open circuit voltage. In one example, the inductor may be reduced by a factor of two, although the inductance may be reduced by more or less.

The switching frequency at which the peak in power dissipation when the short circuit is active occurs depends on the coupling factor and the receiver resonant frequency. By tuning the receiver resonant frequency to a higher frequency, the power dissipation can be shifted in frequency. In one example, the receiver resonator 112 may be tuned to have a receiver resonant frequency of 121 kHz, when the transmitter resonator has a transmitter resonant frequency of 100 kHZ.

The receiver resonant frequency is detuned by selection of the correct value secondary capacitor 124 and secondary inductor 126, while also ensuring a low inductance for the secondary inductor 126, as discussed above. Only the secondary capacitor 124 and secondary inductor 126 alone are responsible for the detuned receiver resonant frequency. Because the detuning is achieved by the components of the receiver resonator 112, rather than selective switching on/off of additional components, the receiver resonator may be considered permanently detuned and/or passively detuned. Furthermore, since the detuning is as a result of the inductance and capacitance of the LC-tank, the detuning is permanent/perpetual.

Figure 5:
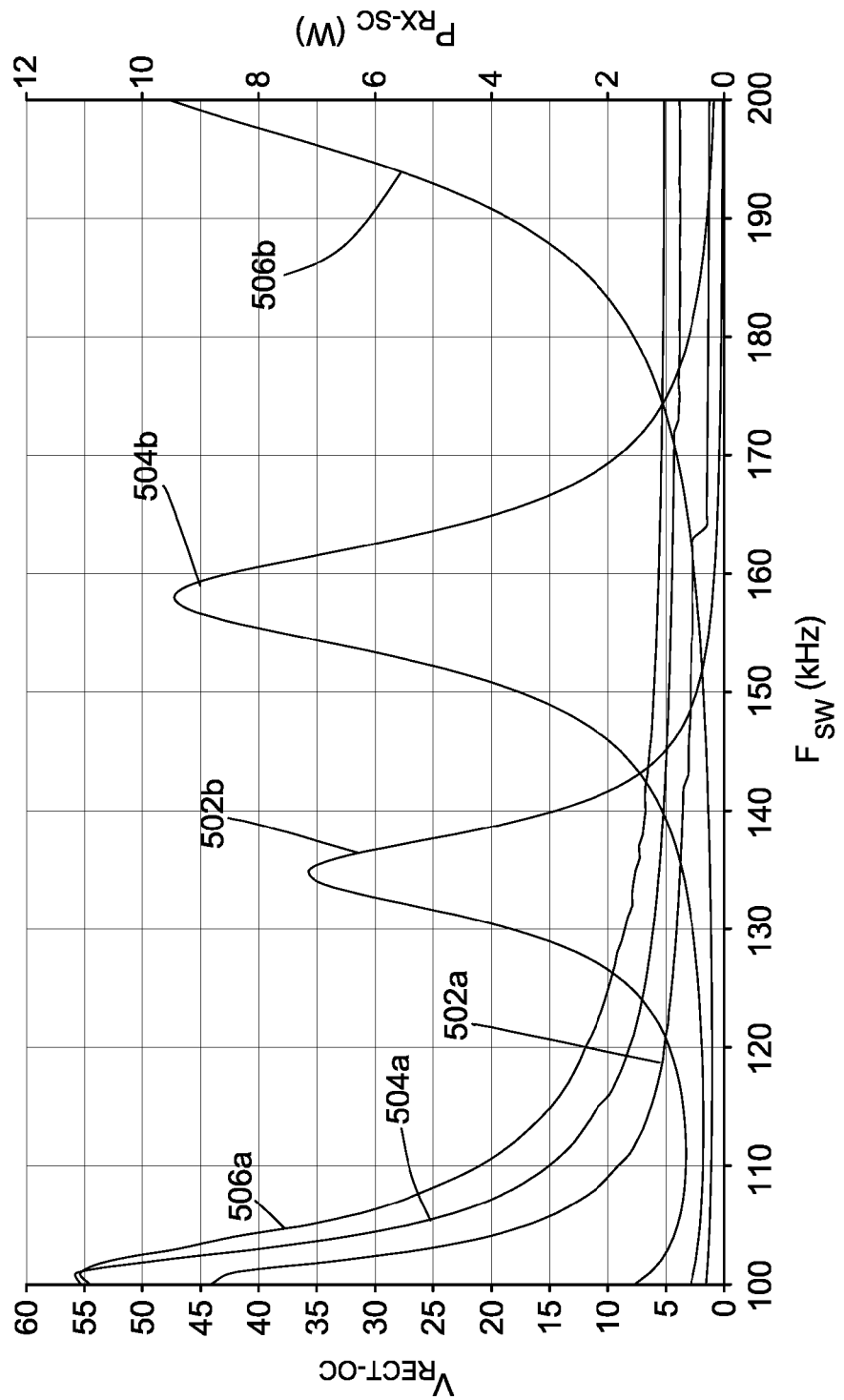
FIG. 5 illustrates the open circuit output voltage and power dissipation of the receiver of FIG. 4.

FIG. 5 shows an example of the power dissipation (right hand y-axis) for a detuned wireless power receiver 104 with a short circuit connected across the receiver resonator 112 as a function of the switching frequency and the open circuit rectifier voltage (left hand y-axis) for a detuned receiver 104 without a short circuit. The receiver 104 modelled in FIG. 5 is the same as the receiver modelled in FIG. 3, except the inductance of the secondary inductor 126 has been reduced by a factor of two, and the receiver resonant frequency is 121 kHz, rather than 100 kHz.

In FIG. 5, a first voltage curve 502a (the lowest curve at $F_{SW}$=120 kHz) shows the voltage for a coupling factor of 0.3, a second voltage curve 504a (the middle curve at $F_{SW}$=120 kHz) shows the voltage for a coupling factor of 0.5, and a third voltage curve 506a (the highest curve at $F_{SW}$=120 kHz) shows the voltage for a coupling factor of 0.7. A first power dissipation curve 502b (with the peak occurring at the lowest frequency) shows the power dissipation for a coupling factor of 0.3, a second power dissipation curve 504b (with the peak occurring at the intermediate frequency) shows the power dissipation for a coupling factor of 0.5, and a third power dissipation curve 406 (with the peak occurring at the highest frequency) shows the power dissipation for a coupling factor of 0.7.

As can be seen from FIG. 5, the regions where both the open-circuit voltage and short circuit dissipation are both too high have been eliminated. This means that the voltage across receiver 104 can be limited to, for example, 5V by using either the detuned receiver resonator 112, or the detuned short circuited receiver resonator 112, with the short circuit active for at least a portion of the duty cycle.

As discussed above, the controller 130 can be used to open and close the switches 128 if the rectifier 114 to provide both rectification and the short circuit, meaning the same receiver 104 can be used across the whole range of switching frequency Therefore, a receiver 104 can be operated within the desired range (maximum voltage 5V and maximum dissipation 1 W) by using short circuit control to turn the short circuit on or off. In the frequency range where the open-circuit voltage in the receiver 104 is below 5V the short circuit control should be switched off. This can be described as synchronous rectification mode. Where the open-circuit voltage in the receiver 104 is above 5V the short circuit control should be switched on, so that the receiver resonator is short circuited for at least part of the duty cycle of the rectifier 114. This can be described as short circuit control mode.

From FIG. 5, it appears fairly easy to determine whether the receiver should be operated in short circuit control mode or synchronous rectification mode, based on the frequency and the coupling factor. However, the receiver 104 does not have explicit knowledge of the coupling factor or switching frequency.

Furthermore, when the receiver 104 is in short circuit control mode, the output voltage of the rectifier 114 does not automatically drop when the switching frequency is increased, as would be expected for synchronous rectification mode.

This is because near the peaks in the short circuit dissipation the magnitude of the current through the receiver resonator 112 increases much faster than the decrease in duty-cycle of the short circuit. Consequently the current to the output of the rectifier 114 tends to increase instead of decrease when short circuit control is active. It is only when the duty-cycle of the short circuit approaches 100% that the output current of the rectifier 114 is reduced but then the receiver resonator 112 is essentially permanently short circuited which increases dissipation.

For example, for coupling factor of 0.3, the output voltage with the short circuit control activated is limited to around 5V. Between 120 kHz and 150 kHz the output voltage of the rectifier 114 with the receiver 104 in short circuit control mode is actually higher than the output voltage of the rectifier 114 in synchronous rectification mode. However, the power dissipation is lower in synchronous rectification, and so the rectifier 114 would operate in synchronous mode.

The short circuit control is switched off when the current through the receiver resonator 112 exceeds a current threshold. This is equivalent to limiting the short circuit dissipation to a threshold but is determined by measuring the current. When the short circuit control is switched off, the output voltage of the rectifier 114 gradually drops to a value less or equal to the voltage expected in synchronous rectification mode.

During the transition from short circuit control mode to synchronous rectification mode, the output voltage of the rectifier 114 can overshoot the limited value. This is because the energy stored in the receiver resonator needs to be absorbed by the rectifier capacitor 116. Consequently, the amount of overshoot depends on the value of the rectifier capacitor 116.

Figure 6A:
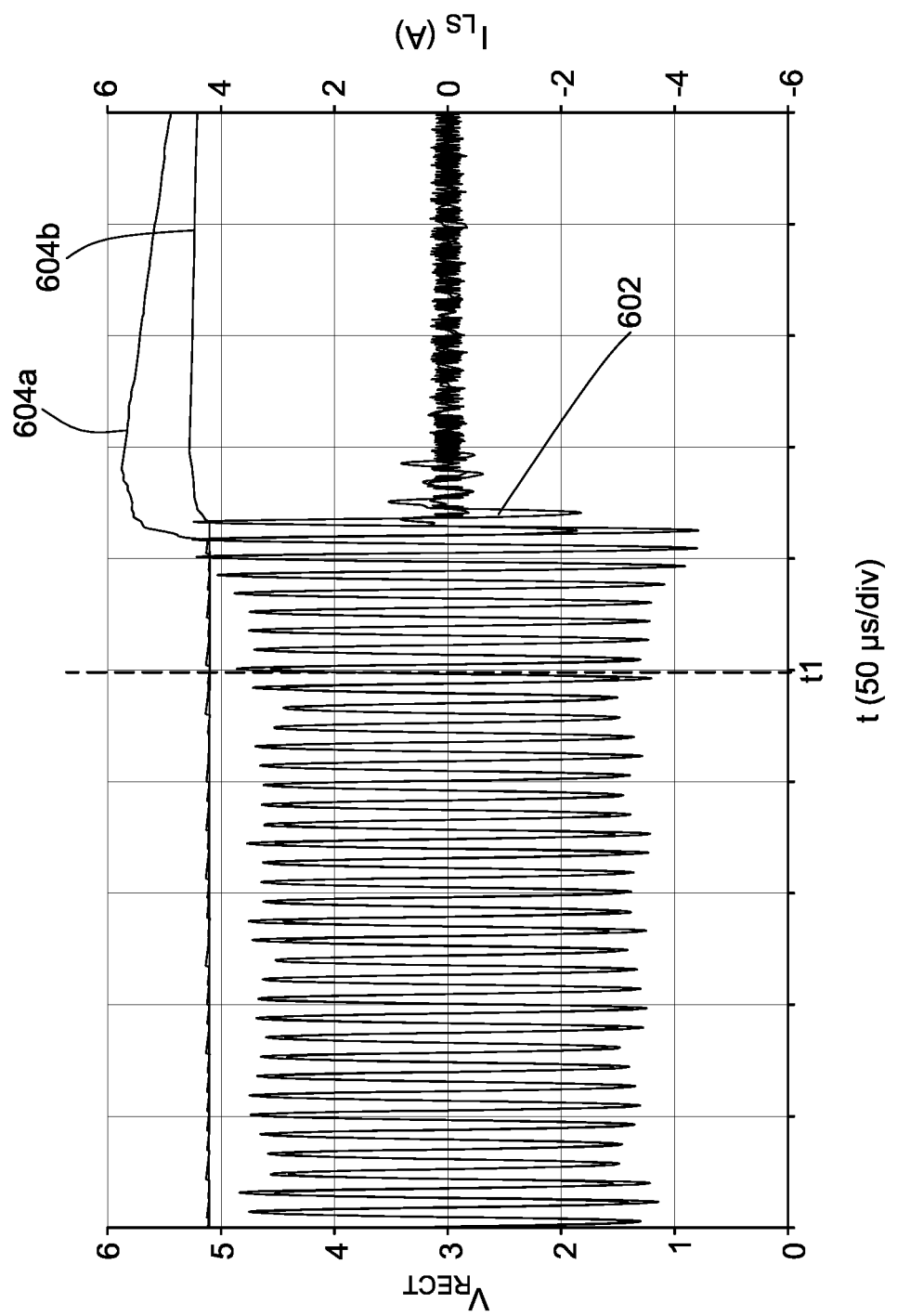
FIG. 6A illustrates the output voltage and current through the receiver of FIG. 4 when the switching frequency of the induced power is increased.

By way of example, FIG. 6A shows the current (right hand y-axis) through the secondary inductor 126 and the voltage (left hand y-axis) at the output node 158, with a coupling factor of 0.3. The current is the curve 602 oscillating about the 0 A axis, and the voltage is shown by the curves 604 towards the top of the plot.

At the left side of FIG. 6A, the receiver 104 is in steady-state, with a switching frequency of 115 kHz. At this frequency the short circuit control is actively regulating the output voltage of the rectifier 114 to just above the 5V target value. The peak inductor current is 3.2 A, which results in a dissipation of 512 mW.

At $t_1$, the switching frequency is increased to 125 kHz. As can be seen the current in the secondary inductor 126 starts to increase. This increase is relatively slow due to the high quality factor of the system (which is a side effect of the short circuit control). After a few cycles of the current, the current hits the threshold value, which is set at 4.5 A in this example. At that time the short circuit control is disabled and the rectifier 114 goes to synchronous rectification mode. The current through the secondary inductor 126 reduces rapidly (because now the quality factor collapses without the short circuit). However, until the current drops to a negligible value, charge is being supplied to the rectifier capacitor 116, increasing the voltage across the rectifier capacitor 116.

FIG. 6A includes a first voltage curve 604a (with the higher voltage) showing the voltage across the rectifier capacitor 116 (equivalent to the output voltage of the rectifier 114) for a rectifier capacitor of 20 micro Farads and a second voltage curve 604b showing the voltage across the rectifier capacitor 116 for a rectifier capacitor of 100 micro Farads.

As can be seen from FIG. 6A, after the overshoot the output voltage of the rectifier converges to the value expected for synchronous mode rectification at 125 kHz which in this case is 4.5V. The rate of convergence depends on the value of the rectifier capacitor 116.

Figure 6B:
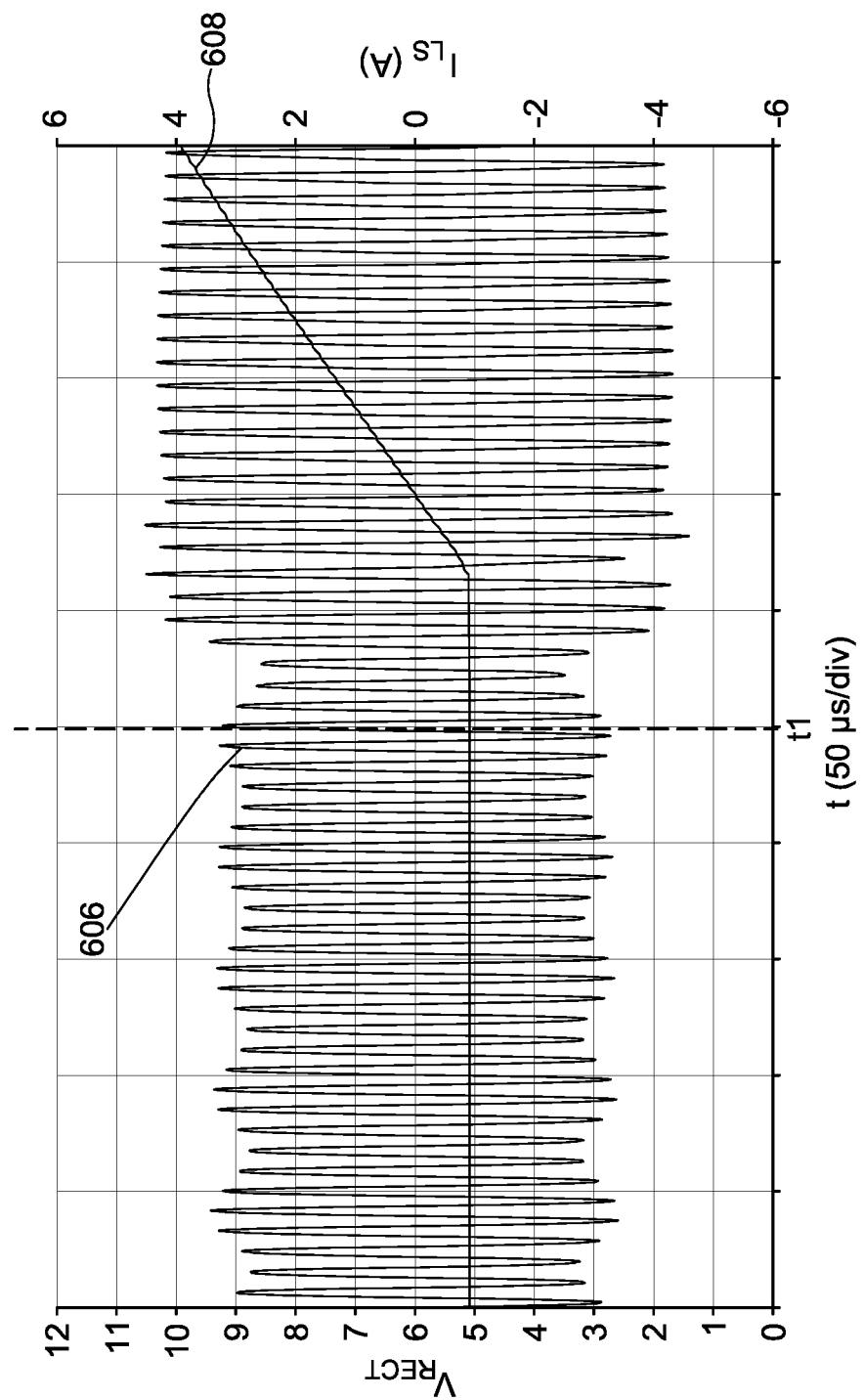
FIG. 6B illustrates the output voltage and current through the receiver of FIG. 4 when the switching frequency of the induced power is decreased.

FIG. 6B shows a second example of the current (right hand y-axis) through the secondary inductor 126 and the voltage (left hand y-axis) at the output node 158, with a coupling factor of 0.3. The current is again the curve 606 oscillating about the 0 A axis, and the voltage is shown by the curve 608 starting at 5V.

At the left side of FIG. 6B, the receiver 104 is in steady-state, with a switching frequency of 115 kHz, as in FIG. 6A. However, in FIG. 6B, the switching frequency drops to 100 kHz at $t_1$. As in FIG. 6A, the current through the secondary inductor 126 starts to increase until it exceeds the current limit (4.5 A) and the short circuit control is disabled. However, at switching frequency of 100 kHz, the open-circuit voltage is 45V. Therefore, instead of dropping to a safe value as in FIG. 6A, the output voltage of the rectifier 114 keeps increasing.

Figure 6C:
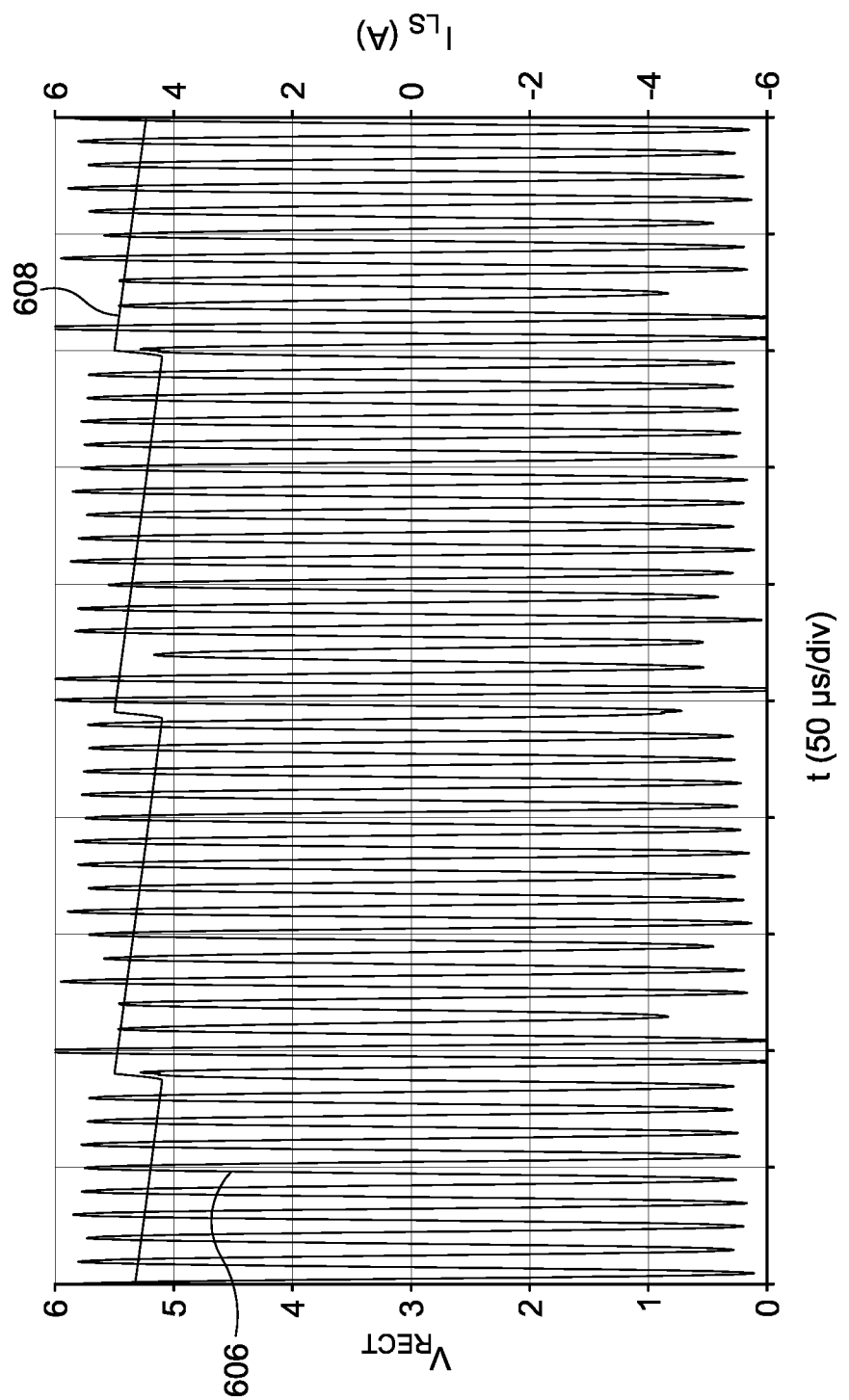
FIG. 6C illustrates the output voltage and current through the receiver of FIG. 4 when the switching frequency of the induced power is closer to the transmitter resonant frequency.

To resolve this situation a second limit is used. When the output voltage of the rectifier exceeds a voltage limit the short circuit control is resumed. However, the current limit is not used to turn the short circuit control off until the voltage at the output node 158 has reduced back to the target value. This will result in a repetitive pattern as shown in FIG. 6C, which shows the voltage at the output node 158, and current through the secondary inductor 126, when the coupling factor is 0.3, the voltage limit is 5.5V, the current limit is 4.5 A and the voltage target is 5V.

In this regime the average current through the secondary inductor 126 and therefore the dissipation in the receiver 104 may be higher than the limit value. Although not ideal this is considered acceptable since it is likely to be rare in a real system, since the switching frequency is always likely to be increased in such situations, to reach the target voltage and hence steady state operation.

FIGS. 6A and 6B show an example of the behaviour of the receiver 104 of FIG. 4 when the receiver 104 is in a steady state in circuit control mode, and the switching frequency changes.

When the wireless power transfer system 100 with a coupling factor of 0.3, starts in steady state operation at a switching frequency of 125 kHz, the rectifier 114 will be operating in synchronous rectification mode. From FIG. 5, it can be seen that the open circuit voltage is approximately 4.5V.

If the switching frequency is then changed to 115 kHz, the voltage will increase. From FIG. 5, the open circuit voltage at 115 kHz is approximately 7 volts. This is above the voltage limit. Therefore, when the voltage limit is reached, the short circuit control mode will be activated.

The above examples of transition behaviour are for a coupling factor of 0.3, transmitter resonator frequency of 100 kHz and receiver resonant frequency of 121 kHz. However, it will be appreciated that this behaviour will be seen for all coupling factors and resonant frequencies, although the precise voltage range at which the transition occurs will change. In the examples shown, it is only for coupling factor of 0.3 that the oscillating mode is seen, for all other coupling factors, the receiver 104 will operate in short circuit control mode as the switching frequency approaches the transmitter resonant frequency. However, it will be appreciated that for other examples, the oscillating mode may be seen for different coupling factors.

Figure 7A:
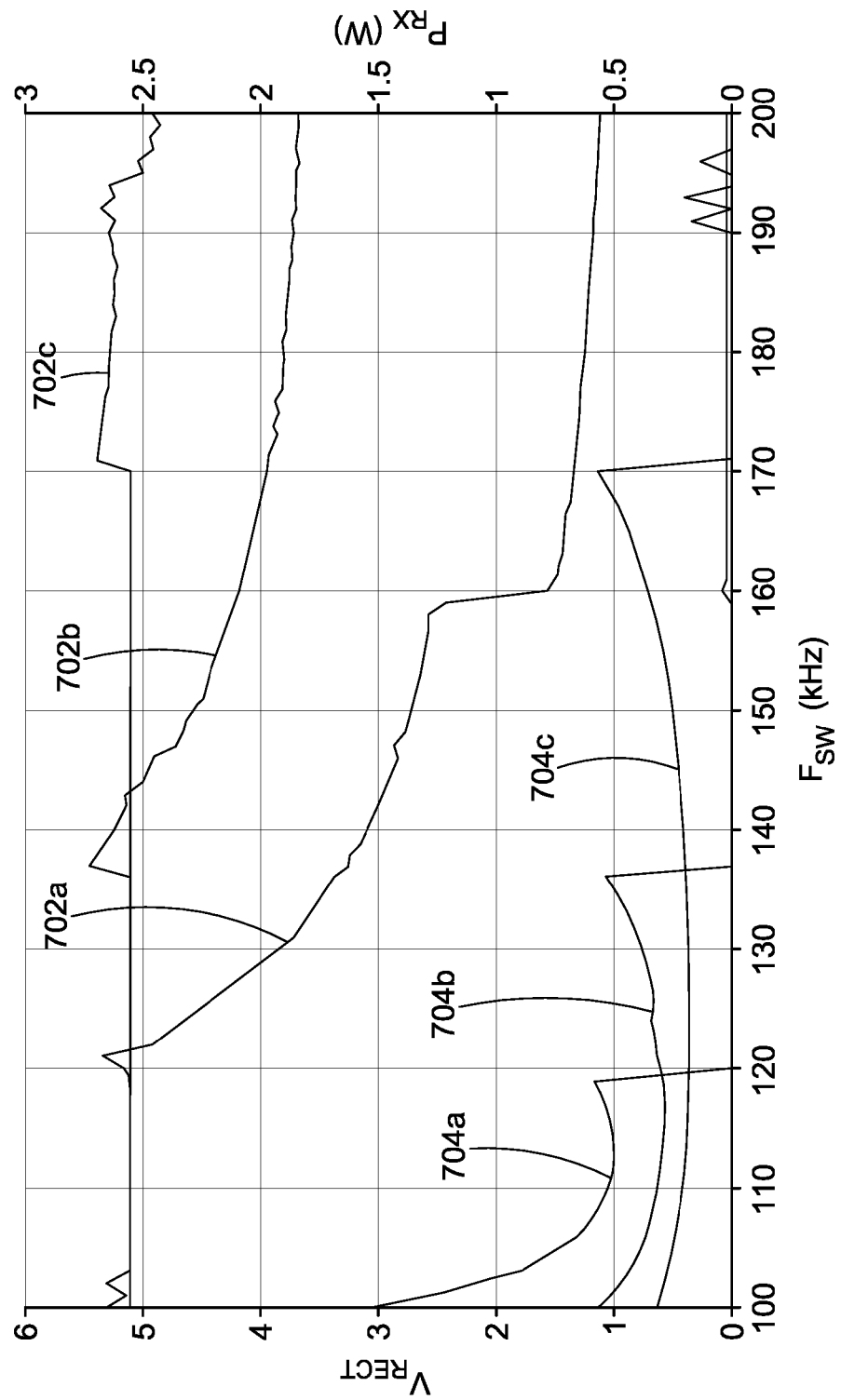
FIG. 7A illustrates the open circuit voltage and power dissipation of the receiver of FIG. 4, when operated with selective short circuit control.
Figure 7B:
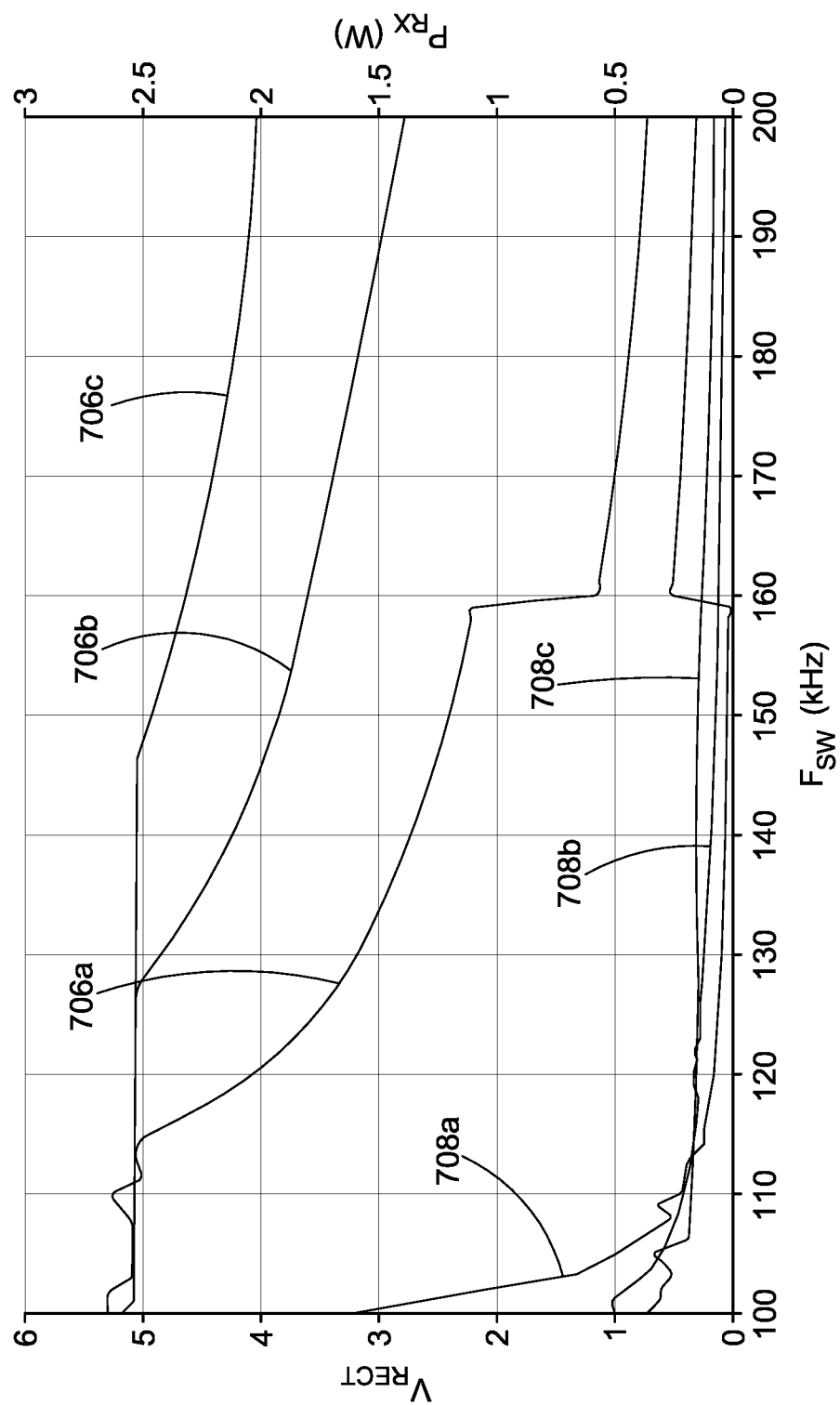
FIG. 7B illustrates the closed circuit voltage and power dissipation of the receiver of FIG. 4, when operated with selective short circuit control.

FIGS. 7A and 7B show the combined curves for dissipation (right hand y-axis) and output voltage (left hand y-axis) for a receiver 104 operated with a synchronous rectification mode and short circuit control mode, as described above. FIG. 7A is for an open circuit receiver 104, and FIG. 7B shows the receiver 104 with a 5 ohm load.

In FIG. 7A, a first voltage curve 702a (the lowest voltage curve at $F_{SW}$=180 kHz) is for a coupling factor of 0.3, a second voltage curve 702b (the middle voltage curve at $F_{SW}$=180 kHz) is for a coupling factor of 0.5 and a third voltage curve 702c (the highest voltage curve at $F_{SW}$=180 kHz) is for a coupling factor of 0.7. Similarly, a first dissipation curve 704a (the highest dissipation curve at $F_{SW}$=110 kHz) is for a coupling factor of 0.3, a second dissipation curve 704b (the middle dissipation curve at $F_{SW}$=110 kHz) is for a coupling factor of 0.5 and a third dissipation curve 704c (the lowest dissipation curve at $F_{SW}$=110 kHz) is for a coupling factor of 0.7.

In FIG. 7B, a first voltage curve 706a (the lowest voltage curve at $F_{SW}$=180 kHz) is for a coupling factor of 0.3, a second voltage curve 706b (the middle voltage curve at $F_{SW}$=180 kHz) is for a coupling factor of 0.5 and a third voltage curve 706c (the highest voltage curve at $F_{SW}$=180 kHz) is for a coupling factor of 0.7. Similarly, a first dissipation curve 708a (the highest dissipation curve at $F_{SW}$=100 kHz) is for a coupling factor of 0.3, a second dissipation curve 708b (the middle dissipation curve at $F_{SW}$=100 kHz) is for a coupling factor of 0.5 and a third dissipation curve 708c (the lowest dissipation curve at $F_{SW}$=100 kHz) is for a coupling factor of 0.7.

As shown in FIGS. 7A and 7B, the detuned receiver, with short circuit control selectively used, means that under the voltage at the output node can be limited to approximately 5V and the voltage rating of all devices in the receiver does not have to be any higher than 5.5V.

In some embodiments, the rectifier behaviour may change further when the voltage drops below an additional limit. At this point, the rectifier may change from synchronous rectification to passive (i.e. all switches 128 open, using just the diodes). This is shown in FIG. 7B, for coupling factor of 0.3, where the receiver 104 changes to passive diode rectification when the output voltage of the receiver 104 drops below 2.5V, at a switching frequency of 160 kHz.

When the load is changed, and the switching frequency and coupling factor kept constant (for example changing the load from 5 ohm to 100 ohm or from 100 ohm to 5 ohm—equivalent to turning the switch 120 on the rectifier output 158 off/on), the voltage does not exceed the 5.5V threshold, and the current only momentarily exceeds 4.5 A. Similar behaviour is seen for sudden changes in the coupling factor (equivalent to moving a mobile device towards/away from a charging station).

The voltage limit used to turn the short circuit on sets the maximum voltage that can appear at the output 158 and should be higher than the target output voltage. The current limit used to turn the short circuit off determines the maximum dissipation that can occur. The margin that is required between the limit and target voltage is determined by the rectifier capacitor 116. A larger rectifier capacitor 116 leads to lower voltage overshoot when changing from short circuit control to synchronous rectification mode.

Figure 8:
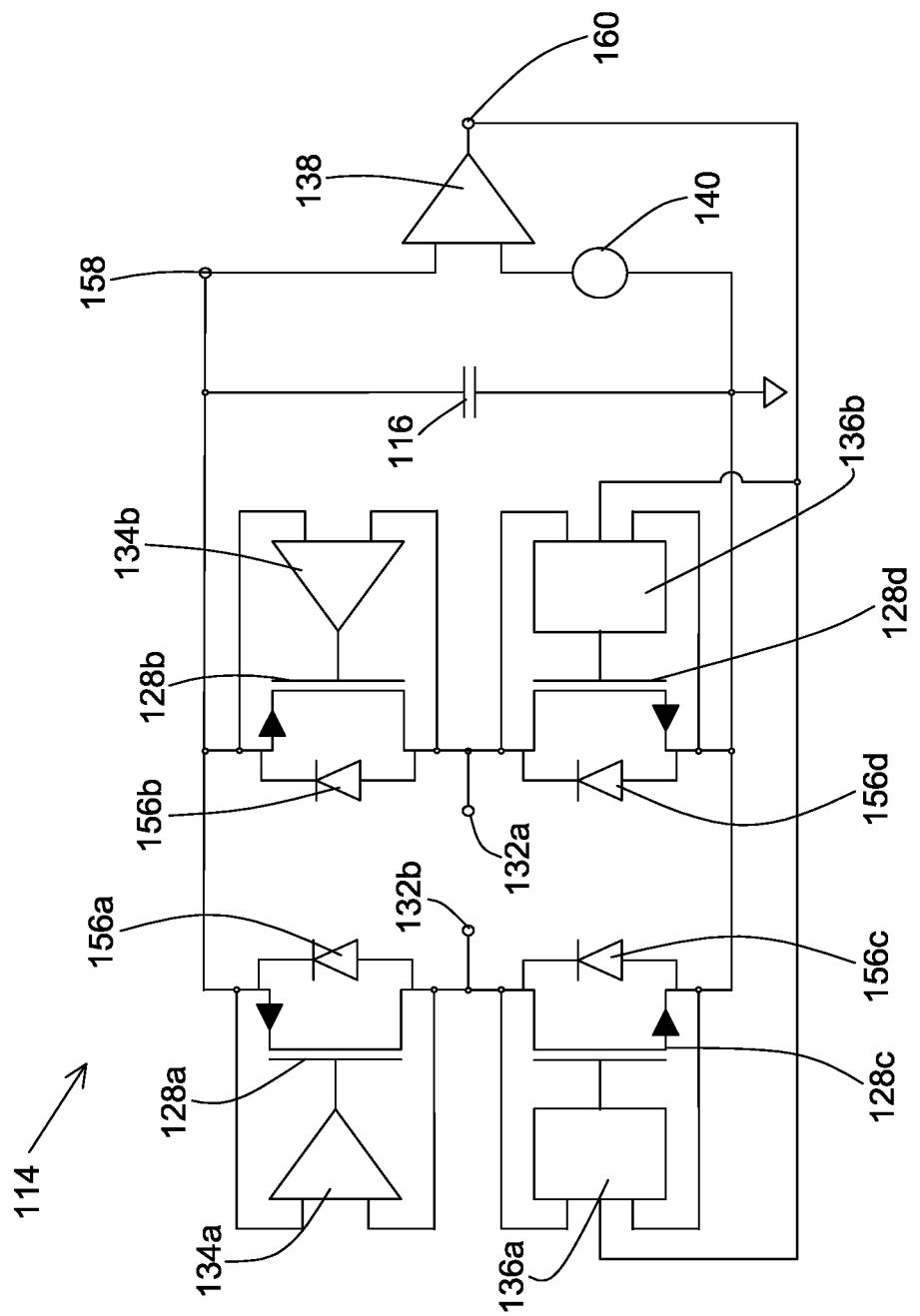
FIG. 8 illustrates an example embodiment of the control circuitry for the synchronous rectifier of the receiver of FIG. 4.

FIG. 8 shows an example embodiment of the rectifier 114 and the controller 130 used to implement the selective short circuit control discussed above. In the example shown in FIG. 8, the controller 130 is formed by several separate elements.

According to the example shown in FIG. 8, a simple proportional loop is used for short circuit control. The first switch 128a and the second switch 128b are implemented with PMOS transistors and the third switch 128c and fourth switch 128d are implemented with NMOS transistors.

The PMOS gates of the first switch 128a and the second switch 128b are driven by comparators 134a, 134b and form a standard synchronous rectifier configuration.

The NMOS gates of the third switch 128c and the fourth switch 128d are driven by control blocks 136a, 136b. The control block 136a, 136b has the drain-source voltage of the NMOS as an input as well as a control voltage. The control voltage is the output of a differential amplifier 138, which determines the difference between the rectifier output voltage and a reference voltage, provided by a voltage source 140.

Figure 9:
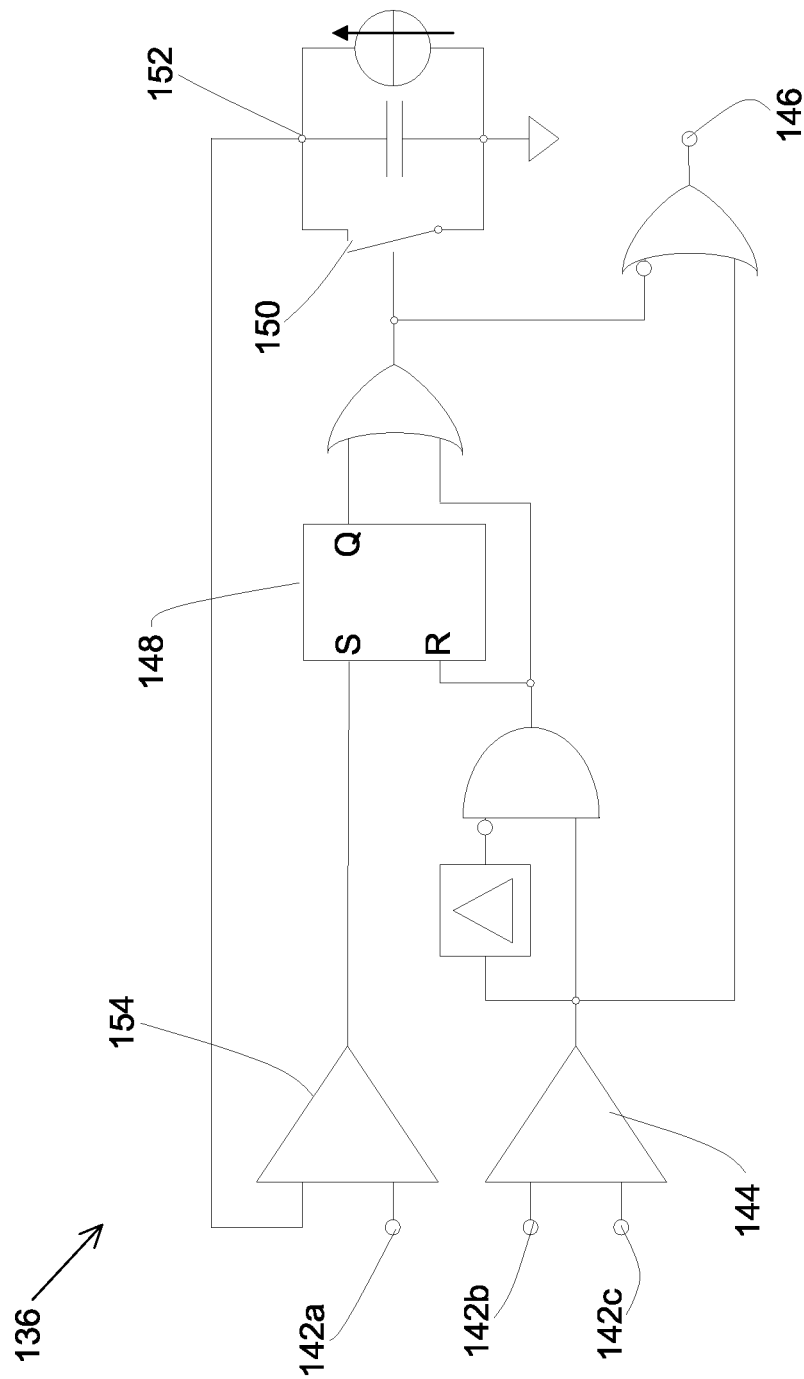
FIG. 9 illustrates an example embodiment of the control block for control the NMOS switches of FIG. 8.

FIG. 9 shows an example of the simplified circuit inside the NMOS control blocks 136a, 136b. As discussed above, the control block 136 has three inputs. The control voltage is provided at a first input 142a, and the source and drain of the NMOS are coupled to a second 142b and third 142c input respectively. The second and third inputs 142b, 142c are coupled to a first comparator 144 to determine the drain-voltage across the NMOS.

When the drain-source voltage of the NMOS becomes negative a pulse start is generated, and at the same time the gate voltage, provided at the control block output 146, goes high, switching on the NMOS switches 128c, 128d.

The start pulse resets the latch 148, and closes the switch 150 so the voltage at the feedback node 152 is pulled to ground. The feedback voltage, and the control voltage are provided to a second comparator 154.

After the start pulse, the voltage at the feedback node 152 starts increasing linearly with time. When the voltage at the feedback node crosses the control voltage, a stop pulse is generated that closes the switch 150 again.

In this manner the switch 150 is opened for a time proportional to the control voltage. If the control voltage is low, which means the output voltage of the rectifier 114 is below the reference voltage, the rectifier 114 operates as a standard synchronous rectifier. The NMOS switches are switched on as long as their drain-source voltage is negative.

Figure 10A:
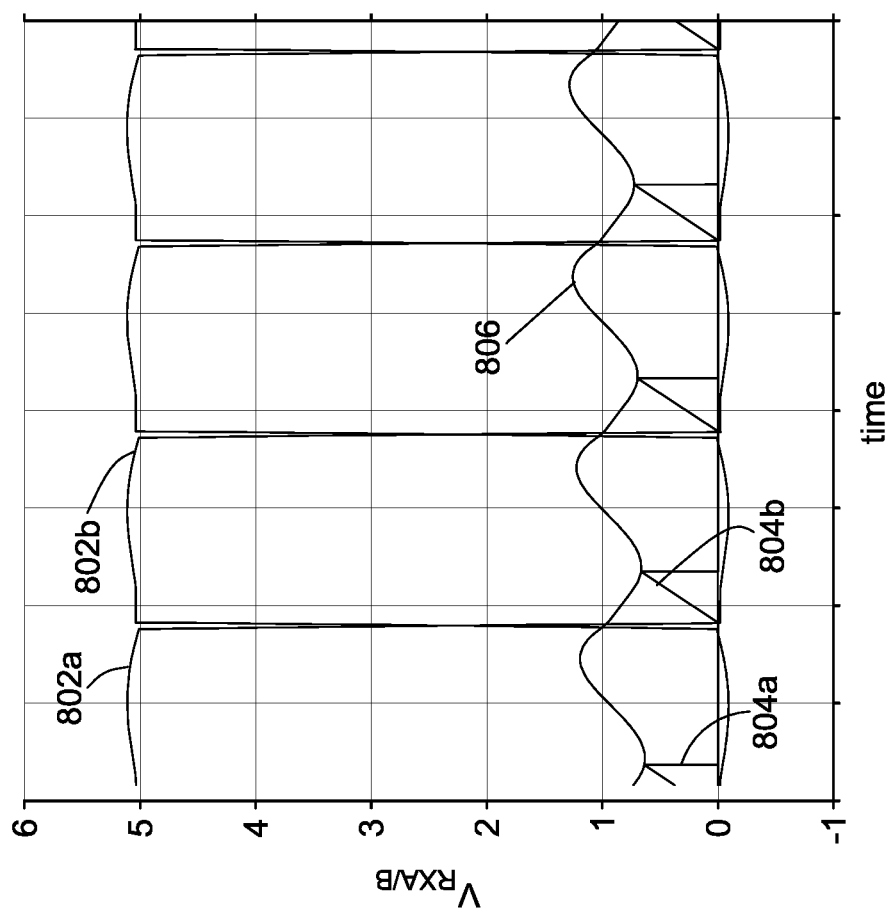
FIG. 10A illustrates the voltages in the rectifier of FIG. 8 when the rectifier is operating in synchronous rectification mode.

FIG. 10A shows the voltages in the rectifier 114 as a function of time during synchronous rectification. A first curve 802a shows the voltage output from the third switch 128c, a second curve 802b shows the voltage output from the fourth switch 128d, a third curve, 804a shows the third switch feedback voltage, a fourth curve 804b shows the fourth switch feedback voltage, and a fifth curve 806 shows the control voltage.

As can be seen from FIG. 10A, an integrating ramp feedback voltage 804 is started after each falling edge of the output voltages 802, but it intersects the control voltage 806 before the rising edge occurs so it has no effect on the operation and the output voltages have a 50% duty cycle.

Figure 10B:
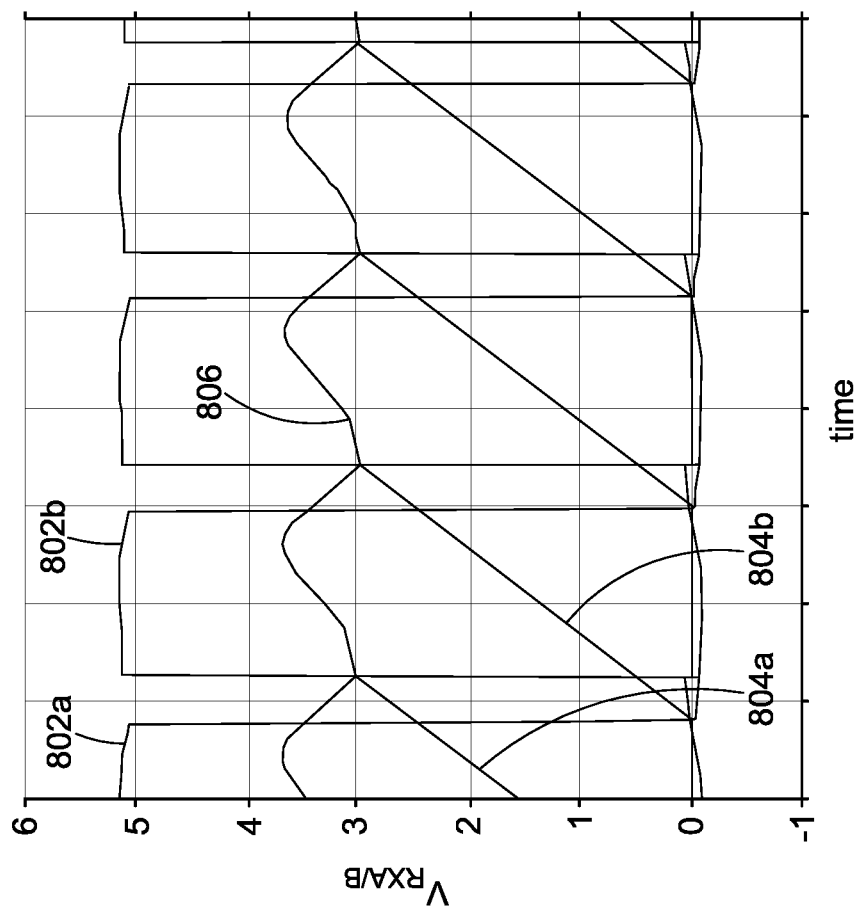
FIG. 10B illustrates the voltages in the rectifier of FIG. 8 when the rectifier is operating in short circuit control mode.

When the output voltage of the rectifier 114 exceeds the reference voltage, then the control voltage will increase and the open time of the switch increases. Now the NMOS switches will be switched on longer, as shown in FIG. 10B. Here the integrating ramps in the feedback voltages 804 cross the control voltage much later, causing the duty-cycle of the rectifier outputs to become less than 50%. Consequently, both NMOS switches will be switched on simultaneously for a period of time during which no current is flowing to the output of the rectifier 114. In this way the output current of the rectifier 114 and therefore the output voltage of the rectifier 114 can be regulated.

The detection of the voltage limit can be implemented by comparing the output voltage of the rectifier 114 to an appropriate reference voltage (higher than the reference voltage used in FIG. 9) with a comparator. Similarly, the detection of the current limit can be implemented by comparing the drain-source voltage of the power MOSFETs (which is proportional to the current through the MOSFET) to an appropriate reference voltage. Alternatively, a sense resistor can be inserted in series with the power MOSFETs and the voltage across this sense resistor can be compared to a reference.

The adaptive system to switch between short circuit and synchronous rectification modes can be implemented in a dedicated digital state-machine or a generic microcontroller, rather than as a described with reference to FIGS. 8 and 9.

The above receivers 104 are described by way of example only. For a system with a transmitter resonant frequency of 100 kHz, that is designed to deliver a power of 5 W to the load 118, the same results can be achieved for any suitable inductor value and detuning frequency.

Reducing the secondary inductor 126 means the secondary inductor 126 can be realized with fewer turns and thus less copper than an inductor with higher inductance, which decreases the material cost. The reduction in the inductance of the secondary inductor 126 may, however, be limited because:

A smaller secondary inductor increases the losses in the transmitter 102, reducing the end-to-end efficiency of the wireless power transfer system 100; and A minimum voltage is required for the receiver to function. For example, if the open circuit receiver voltage falls below 1.5V for low values of the coupling factor k, the receiver 104 will not efficiently transfer power.

Although the above examples have been described with reference to a transmitter resonant frequency of 100 kHz, a voltage limit of 5.5V, a target voltage of 5V and a current limit of 4.5 A, it will be appreciated that these values are examples only, and may be changed as required/desired. For example, voltage limit may be 6V, 7.5V or 10V.

In the above description, the receiver resonator 112 is an LC-tank and the rectifier 114 is a synchronous bridge rectifier. However, it will be appreciated that any suitable resonator may be used as the receiver resonator 112, and any suitable AC to DC converter may be used as the rectifier 114. Furthermore, the short circuit need not be implement as part of the rectifier 114, and may be implemented separately. Similarly, the transmitter resonator 110 is not necessarily an LC-tank and any suitable design may be used for the wireless power transmitter 102.

In the above description, the wireless power transfer receiver 104 has been described in terms of the Qi standard with inductive coupling between the transmitter 102 and receiver 104. However, it will be appreciated that the techniques above devices can be applied to other standards with variable switching frequency, and other wireless power transfer systems not covered by existing standards, both radiative and non-radiative.

In the above example, the first 128a and second 128b switch are implemented as PMOS transistors and the third 128c and fourth switches 128d are implemented as NMOS transistors. However, it will be appreciated that any suitable transistor may be used for each switch, so that all of the switches 128 may be PMOS, NMOS, or any combination of the two.

From reading the present disclosure, other variations and modifications will be apparent to the skilled person. Such variations and modifications may involve equivalent and other features which are already known in the art of wireless power transfer systems and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A wireless electrical power receiver for inductively generating alternating current power in a wireless electrical power transfer system having a transmission resonant frequency, the receiver comprising:

a receiver resonator having a receiver resonant frequency, the receiver resonator constructed and arranged such that the receiver resonant frequency is detuned from the transmission resonant frequency;

a rectifier arranged to convert the alternating current power to a direct current power, for providing the direct current power to a load; and a controller configured to selectively short circuit the receiver resonator, such that electrical current is retained in the receiver resonator when the receiver resonator is short circuited, wherein the controller is configured to activate the short circuit of the receiver resonator if an output voltage of the rectifier exceeds a first threshold, and wherein the controller is configured to deactivate the short circuit of the receiver resonator if a current in the receiver resonator exceeds second threshold.

2. The wireless electrical power receiver as claimed in claim 1, wherein the rectifier is a synchronous rectifier comprising a plurality of switches, and wherein the controller is configured to control the plurality of switches to rectify the induced alternating current power, and to selectively short circuit the receiver resonator.

3. The wireless electrical power receiver as claimed in claim 2, wherein the breakdown voltage of each of the plurality of switches is less than or equal to 6 volts.

4. The wireless electrical power receiver as claimed in claim 2, wherein the rectifier comprises a first pair of switches, and a second pair of switches, wherein the first pair of switches is implemented as P-type MOS transistors.

5. The wireless electrical power receiver as claimed in claim 4, wherein the controller is configured to:

close a one of the first pair and a one of the second pair of switches, and open the other of the first pair of switches and the other of the second pair of switches in order to convert the alternating current power to a direct current power; and open both of the first pair of switches and close both of the second pair of switches to short circuit the receiver resonator.

6. The wireless electrical power receiver as claimed in claim 1, wherein if the output voltage of the rectifier exceeds a third threshold, higher than the first threshold, the controller is configured to:

activate the short circuit of the receiver resonator; and subsequently deactivate the short circuit of the receiver resonator if the current in the receiver resonator exceeds the second threshold only when the output voltage of the rectifier is below the first threshold, wherein the short circuit oscillates between active and inactive.

7. The wireless electrical power receiver as claimed in claim 1, wherein the controller is configured to activate or deactivate the short circuit to maintain the output voltage of the rectifier below a first limit and to maintain a power dissipation of the receiver below a second limit.

8. The wireless electrical power receiver as claimed in claim 7, wherein the inductively generated alternating current power oscillates at a first frequency, the first frequency having a value taken from a range of operating frequencies, and wherein the controller maintains the output voltage of the rectifier below the first limit and the power dissipation of the receiver below the second limit over the range of operating frequencies.

9. The wireless electrical power receiver as claimed in claim 7, wherein the third threshold is equal to the first limit, and wherein the first limit is a voltage rating of the rectifier.

10. The wireless electrical power receiver as claimed in claim 1, wherein the controller is configured to control the wireless power receiver such that:
  in a first mode of operation, the short circuit of the receiver resonator is activated;
  in a second mode of operation, the short circuit of the receiver resonator is deactivated;
  in a third mode of operation, the short circuit is oscillated between activated and deactivated; and
  the wireless power receiver switches between the first, second and third modes of operation.

11. A wireless electrical power transfer system as claimed in claim 1, wherein the receiver resonator comprises an inductor and a capacitor, the inductance of the inductor and the capacitance of the capacitor configured to provide the detuned receiver resonant frequency.

12. A wireless electrical power transfer system comprising:
  a wireless electrical power transmitter comprising a transmitter resonator tuned to the transmission resonant frequency; and
  a wireless electrical power receiver as claimed in claim 1.

13. A wireless electrical power receiver for inductively generating alternating current power in a wireless electrical power transfer system having a transmission resonant frequency, the receiver comprising:
  a receiver resonator having a receiver resonant frequency, the receiver resonator constructed and arranged such that the receiver resonant frequency is detuned from the transmission resonant frequency;
  a rectifier arranged to convert the alternating current power to a direct current power, for providing the direct current power to a load; and
  a controller configured to selectively short circuit the receiver resonator, such that electrical current is retained in the receiver resonator when the receiver resonator is short circuited,
  wherein the controller is configured to activate or deactivate the short circuit to maintain the output voltage of the rectifier below a first limit and to maintain a power dissipation of the receiver below a second limit.

14. A wireless electrical power receiver for inductively generating alternating current power in a wireless electrical power transfer system having a transmission resonant frequency, the receiver comprising:
  a receiver resonator having a receiver resonant frequency in tune with the transmission resonant frequency;
  a rectifier including a plurality of switches that are controlled to regulate an output voltage of the rectifier; and
  a rectifier capacitor connected across an output of the rectifier,
  wherein the receiver is configured to couple with a transmitter at a plurality of coupling factors, and
  wherein the switches in the receiver have a breakdown voltage that is higher than a maximum voltage that can appear at the output of the rectifier at any coupling factor.

15. The receiver as claimed in claim 14, wherein the breakdown voltage of the switches is higher than 55V.

16. The receiver as claimed in claim 14, wherein the receiver resonant frequency is in tune with the transmission resonant frequency.

17. The receiver as claimed in claim 14, wherein the receiver resonant frequency is out of tune with the transmission resonant frequency.

* * * * *